United States Patent [19]

Ikumi

[11] Patent Number: 5,005,117

[45] Date of Patent: Apr. 2, 1991

[54] THREE-DIMENSIONAL COMPUTER GRAPHICS APPARATUS WITH TWO-PORT MEMORY FOR STORING DEPTH INFORMATION

[75] Inventor: Nobuyuki Ikumi, Tokyo, Japan

[73] Assignee: Kabushiki Kaisha Toshiba, Kawasaki, Japan

[21] Appl. No.: 251,164

[22] Filed: Sep. 29, 1988

[51] Int. Cl.⁵ .................. G06F 3/153; G06F 15/70; G09G 1/16

[52] U.S. Cl. .................. 364/200; 364/237.2; 364/237.3; 364/237.7; 364/239; 364/244; 364/244.8; 364/247.4; 364/259; 364/259.2; 364/271.5; 358/92; 358/107

[58] Field of Search ... 364/200 MS File, 900 MS File, 364/521, 522; 340/728, 729; 358/92, 107

[56] References Cited

U.S. PATENT DOCUMENTS

| | | | |
|---|---|---|---|
| 4,475,104 | 10/1984 | Shen | 340/729 |
| 4,609,917 | 9/1986 | Shen | 340/729 |
| 4,679,041 | 7/1987 | Fetter et al. | 340/729 |
| 4,697,178 | 9/1987 | Heikel | 364/521 X |
| 4,723,159 | 2/1988 | Imsand | 358/92 |
| 4,839,824 | 6/1989 | Ando | 364/900 |

FOREIGN PATENT DOCUMENTS

WO86/00454 of 0000 PCT Int'l Appl. .

OTHER PUBLICATIONS

Foley et al., Fundamentals of Interactive Computer Graphics, pp. 553–573, 1982.
Patent Abstracts of Japan, vol. 9, No. 269 (P-400) [1992], Oct. 26, 1985 for Japanese Patent Disclosure No. 60 114970A; S. Takahashi; Jun. 21, 1985.
Ohhashi et al., "A 32b 3-D Graphic Processor Chip with COM Pixels/s Gouraud Shading," IEEE International Solid-State Circuits Conference Digest of Technical Papers, pp. 168, 169, Feb. 18, 1988.
U.S. Patent Application 07/101,980 filed Sep. 28, 1987.

Primary Examiner—Archie E. Williams, Jr.
Assistant Examiner—Emily Y. Chan
Attorney, Agent, or Firm—Finnegan, Henderson, Farabow, Garrett, and Dunner

[57] ABSTRACT

Depth information is stored in a 2-port memory having a random port and a serial port. The depth information is read out from the serial port of the 2-port memory and is supplied to an integrated circuit. The integrated circuit performs pipeline processing by using the depth information read out from the 2-port memory. If write-in is necessary as a result of the pipeline processing, the processed depth information is supplied to the random port of the 2-port memory, and the depth information is stored once again in the 2-port memory.

1 Claim, 3 Drawing Sheets

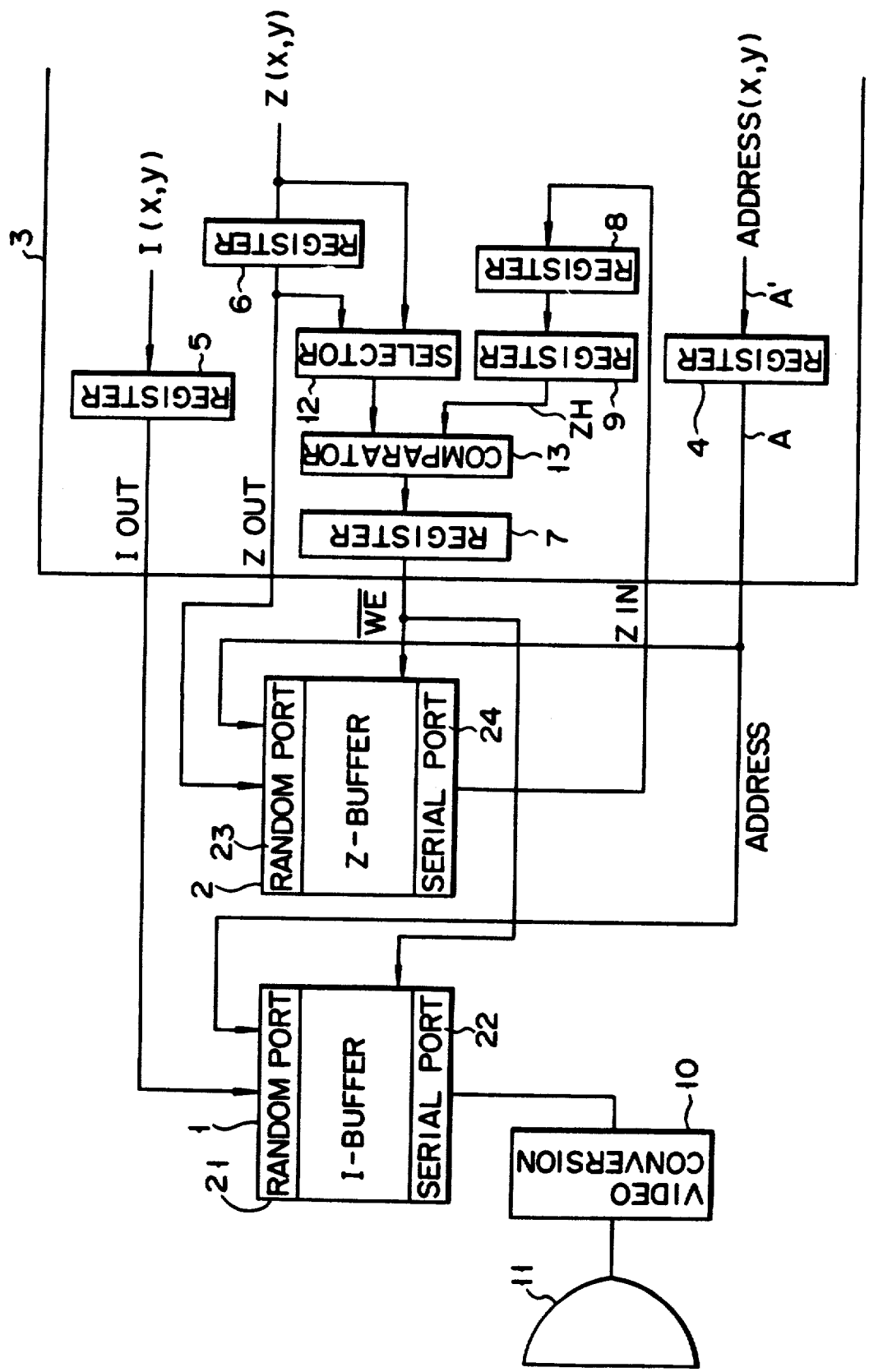
F I G. 3

THREE-DIMENSIONAL COMPUTER GRAPHICS APPARATUS WITH TWO-PORT MEMORY FOR STORING DEPTH INFORMATION

BACKGROUND OF THE INVENTION

1. Field of the Invention

The present invention relates to a control apparatus for controlling a depth information buffer (hereinafter, referred to as "Z-buffer") used in removing invisible planes in three-dimensional computer graphics.

2. Description of the Related Art

In three-dimensional graphic processing using a computer, when a plurality of objects are overlapped, invisible planes are removed in order to determine which edges and which planes of which object are visible and to display only visible planes. Conventionally, various algorithms are employed for removing invisible planes, as disclosed in Fundamentals of Interactive Computer Graphics, by J. D. Foley and A. Vandam, Addison Wesley Publishing Co., pp. 553-573, 1982. Among them, a Z-buffer algorithm is simple and widely used. In the Z-buffer algorithm, a Z-value (depth value) of each pixel on a screen is stored in a memory called a Z-buffer in advance. Then, a Z-value of each point (coordinates on the screen being represented by x and y) within a polygon is calculated, and the obtained calculation result is compared to the Z-value stored in the Z-buffer which corresponds to an (x, y) point. When the former is smaller than the latter, a data is written in a refresh buffer, and if not, no data is written therein.

FIG. 1 shows an example of a structure of a conventional processing system using a Z-buffer. FIG. 2 is a timing chart showing the operation timing of this system. In FIG. 1, I-buffer (brightness data buffer) 31 stores an I-value (brightness value) of each point on a screen. Normally, a dual port (2-port) memory is employed as I-buffer 31. Data in I-buffer are read out at high speed from its serial port. Readout data are sequentially converted into video signals and displayed on image display device 32 such as a CRT display. Control LSI 33 calculates address (x, y), I (x, y) and Z (x, y) of each point of an object. The address (x, y) is commonly supplied to I-buffer 31 and Z-buffer 34. I-value is fed to I-buffer 31. When a write-in operation is judged necessary by the comparison result Z (x, y) (described later), a new Z-value is fed to Z-buffer 34. In this manner, a write-in control for I-buffer 31 and Z-buffer 34 is performed. The processing performed by control LSI 33 comprises four basic cycles. In the first cycle, a calculation of address I, Z of a given point (xii, Yii) (i=0, 1 ...) on the screen is made. In the second cycle, the address is supplied to Z-buffer 34, and value Z' (xi, yi) corresponding to the above (xi, yi) is read out. In the third cycle, the read-out value Z' (xi, yi) is compared to the above calculated Z-value Z (xi, yi). If Z' (xi, yi) > Z (xi, yi), it is judged that Z (xi, yi) is closer to the front (i.e., the depth thereof is closer). Thus, in the fourth cycle, the I-value and Z-value of the point (xi, yi) are written in I-buffer 31 and Z-buffer 34 in a corresponding manner.

However, in the above processing, one cycle is required for reading out the Z-value, resulting in a disadvantage in which the processing speed is decreased.

SUMMARY OF THE INVENTION

The present invention has been made in order to solve the problem that the processing speed is reduced owing to the readout of the Z-value. The object of the invention is to provide a depth information buffer control apparatus which can prevent the lowering of the processing speed due to the readout of the Z-value.

In the depth information buffer control apparatus, a 2-port memory having a random port and a serial port is employed as a depth information buffer for removing invisible planes in three-dimensional computer graphics. A Z-value is read out from the serial port and is input to a control integrated circuit, thereby performing pipeline processing. When write-in is necessary as a result of the processing, the Z-value calculated in the inside are written in from the random port of the 2-port memory.

Accordingly, the write-in and readout on the 2-port memory can be simultaneously performed. Though a little setup time is required for the serial input of the Z-value in the control integrated circuit, the removal of invisible planes at respective points on the screen can be effected substantially in a single cycle. Therefore, the processing speed can be remarkably enhanced.

According to the present invention, there is provided a three-dimensional computer graphics apparatus in which depth information, brightness information and memory addresses of respective coordinate points on a screen of the apparatus are calculated by an integrated circuit and the depth information and brightness information are stored in respective display buffers in accordance with the memory addresses, the integrated circuit comprising depth information storing means for storing the calculated depth information of the coordinate points; selecting means for selecting the calculated depth information of the coordinate points and the depth information stored in the depth information storing means, delay means for delaying the transfer of depth information of respective coordinate points supplied from the outside of the integrated circuit, after a predetermined period of time from beginning an input operation of the depth information, to the depth information display buffer; and comparing means for comparing the calculated depth information selected by the selecting means with the depth information transferred from the delay means and for activating a write-in control signal on the basis of a result of the comparison, the display buffer for the depth information including a two-port memory means for storing the depth information in accordance with the write-in control signal, the memory means having a random port through which the depth information stored in the depth information storing means in the integrated circuit is entered, and the memory means having a serial port through which the information stored in the memory means is supplied to the delay means in the integrated circuit.

BRIEF DESCRIPTION OF THE DRAWINGS

In the accompanying drawings:

FIG. 3 is a view for explaining a structure of a depth information buffer control apparatus according to an embodiment of the present invention.

EMBODIMENT OF THE INVENTION

Figure 1:
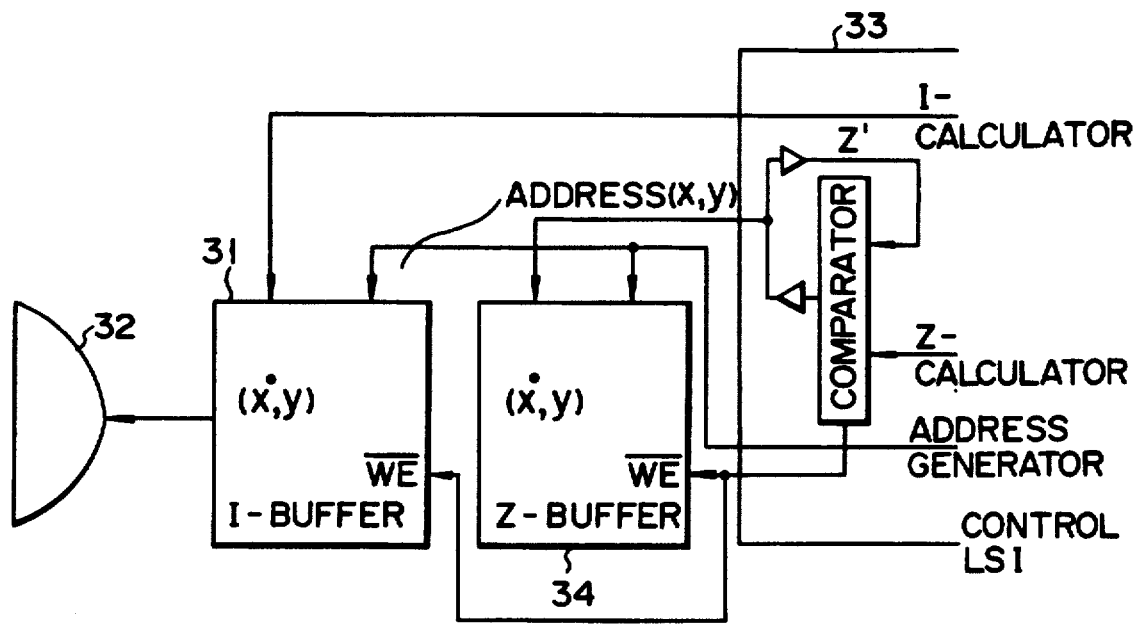
FIG. 1 is a view for explaining the structure of a conventional depth information buffer control apparatus.
Figure 2:
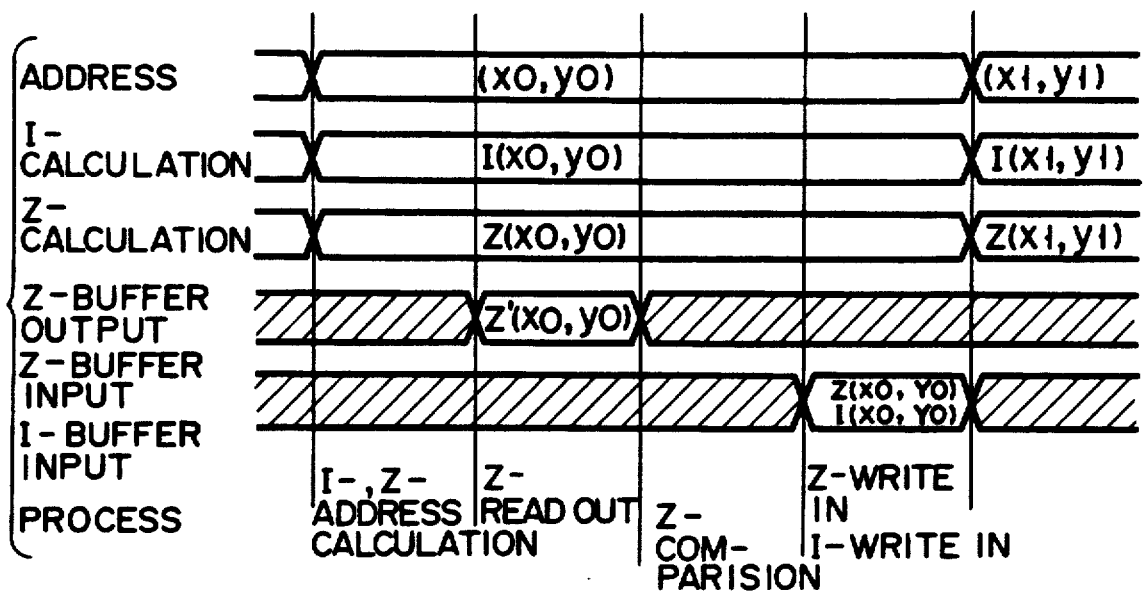
FIG. 2 is a timing chart for explaining the operation of the apparatus shown in FIG. 1.

An embodiment of the present invention will now be described with reference to the accompanying drawings.

In a three-dimensional graphic processing apparatus shown in FIG. 3, I-buffer (brightness information buffer) 1 stores I-values (brightness values) of respective points on a screen. A 2-port memory having random port 21 and serial port 22 is employed as I-buffer 1. Z-buffer (depth information buffer) 2 stores Z-values of respective points on the screen. A 2-port memory having random port 23 and serial port 24 is employed as Z-buffer 2. It is desirable that random ports 21 and 23 of each 2-port memory allow high-speed access (high-speed page access), because in usual cases a screen paint-out processing in three-dimensional graphics is carried out in the horizontal direction on the screen and memory access is sequentially performed column by column in one row. Control LSI 3 feeds various control signals to buffers 1 and 2, and calculates address (x, y), I (x, y), and Z (x, y) of each point of an object. Control LSI 3 supplies the address through register 4 commonly to I-buffer 1 and Z-buffer 2, and supplies I (x, y) through register 5 to the random port 21 of I-buffer 1. In control LSI 3, Z (x, y) is fed through selector 12 to one input terminal of comparator 13 and compared with the other input (described later). When the comparison result of comparator 13 indicates the necessity of write-in, the Z-value calculated inside is supplied through register 6 to the random port 23 of Z-buffer 2. Also, control LSI 3 supplies a write-in control signal through register 7 to I-buffer 1 and Z-buffer 2. A Z-value read out from the serial port 24 of Z-buffer 2 is serially input to LSI 3, and the Z-value is fed to the above-mentioned other input of comparator 13 through internal two-stage registers 8 and 9, thereby delaying the Z-value by a predetermined period of time and supplying it to comparator 13. Hereinafter the delay operation performed through two registers 8 and 9 is referred to as a pipeline operation.

Comparator 13 sequentially compares the Z-values of respective points on the screen previously in Z-buffer 2 and the Z-values calculated by control LSI 3. When a Z-value of the first point on the screen is compared by comparator 13, selector 12 selects Z-values which are calculated inside LSI 3 and are not fed through register 6, and sequentially supplies them to comparator 13. Video signal converting circuit 10 converts the I-value read out from the serial port of I-buffer 1 into a video signal and feeds the obtained video signal to image display device (e.g., CRT display) 11.

In the case of a 2-port memory, the readout from the serial port requires a so-called internal data transfer cycle, wherein data corresponding to one line are transferred from a memory cell array to a serial conversion shift register. After the transfer of data, data are serially read out from the serial port in an incremental manner from the designated address in synchronism with a serial port.

Figure 4:
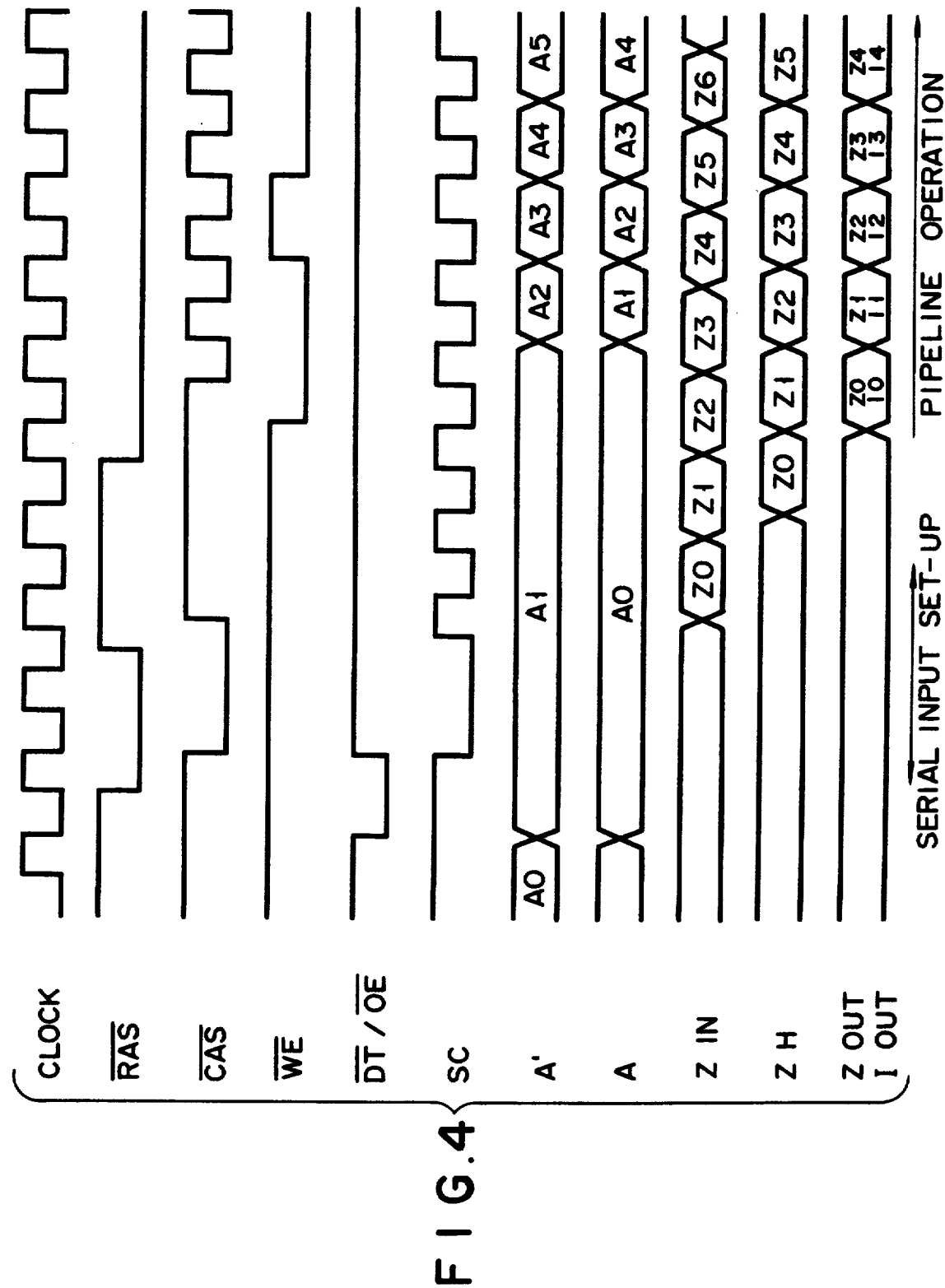
FIG. 4 is a timing chart for explaining the operation of the apparatus shown in FIG. 3.

The operation of the above-described three-dimensional processing apparatus will now be described with reference to the timing chart of FIG. 4.

LSI 3 supplies RAS (row address strobe) signal and CAS (column address strobe) signal (both not shown in FIG. 3) to buffers 1 and 2. When RAS signal has an active level (low level) and DT/OE (data transfer control/output enable) signal has an active level (low level), the operation of serially supplying a serial output from Z-buffer 2 to LSI 3 starts. More specifically, an internal transfer operation is carried out within Z-buffer 2. Data of address A0 at this time (in reality, including both row address and column address) is located at the forefront position. After DT/OE signal is set in the non-active state, data are serially supplied from Z-buffer 2 to LSI 3 each time the column address is counted up in synchronism with serial control clock SC. In LSI 3, the serial input data $Z_H$, which has passed through two-stage registers 8 and 9, is compared with internally calculated value Z. When $Z_H$ is greater than Z, WE (write enable) signal is set in the active state, and I-value Iout which has been calculated internally and held in register 5 and Z-value Zout held in register 6 are written in address A0 in I-buffer 1 and Z-buffer 2 in the next cycle. When $Z_H$ is smaller than Z, the write operation is not performed. A series of Z-values read out from serial port 24 of Z-buffer 2 is input to LSI 3 and the first comparison of the Z-values is carried out in LSI 3. Before the write-in operation of the Z-values is completed on the basis of a result of the comparison in Z-buffer 2, LSI 3 does not calculate the next address, I-values, or Z-values. After the completion of the first write operation, the internal calculation starts, and the operations of Z-value input, comparison and write are performed in a pipeline manner. The serial data is read out from serial port 24 of Z-buffer 2 and then a preparation for reading out the next data from serial port 24 is made in Z-buffer 2 before the first Z-value is output from LSI 3.

When the readout page in Z-buffer 2 is changed and the row address and column address are reset, the above-mentioned pipeline-like operations are suspended. The change of the readout page and the reset of row and column addresses require several cycles. The time loss due to the reset is negligible in the case of data in a transversely elongated region (e.g., in the case of accessing full-page data), and it is considered that the general processing is performed with basic clock cycles of the LSI.

The above embodiment may be compared with the prior art as follows.

A cycle period necessary for once reading/writing data from and in a buffer does not always coincide with a cycle period for one processing operation (calculation, write-in) of a LSI. For example, a time period necessary for one cycle of the buffer is about three times longer than a time period necessary for one cycle of the LSI. Assuming that these time periods are equal to each other in the conventional apparatus, in terms of basic cycles of the LSI, an eight-cycle period is required at the time of comparison and rewrite-in of a Z-value of a point. On the other hand, in the above-embodiment, though several cycles are necessary in a preparation period during which data is read out from serial port 24 inside Z-buffer 2, the comparison of Z-values of respective points is performed by comparator 13 with the basic cycle of the LSI. For this reason, the operation speed of the apparatus according to the above embodiment is about eight times higher maximum, and about four or five times higher at a normal state, than the conventional apparatus.

As described above, according to the depth information buffer control apparatus, the decrease in processing speed due to the readout of the Z-value can be prevented, and the removal of invisible planes in three-dimensional computer graphics can be performed at high speed, with enhanced real time characteristics.

What is claimed is:

1. A three-dimensional computer graphics apparatus in which depth information, brightness information, and memory addresses of a plurality of coordinate points on a screen of the apparatus are calculated by an integrated circuit, wherein the depth information and the brightness information are stored in respective depth information display and brightness information display buffers in accordance with the memory addresses, said integrated circuit comprising:

depth information storing means for storing the calculated depth information of the coordinate points;

register means for storing depth information for a first of said plurality of coordinate points;

selecting means for selecting the depth information in said register for said first of said plurality of coordinate points and for selecting the calculated depth information in said storing means serially for all but the first of said plurality of coordinate points;

delay means for delaying transfer of the calculated depth information of said plurality of coordinate points for a predetermined period of time;

comparing means, connected to said selecting means and to said delay means, for comparing the calculated depth information selected by said selecting means with the depth information delayed by said delay means, and for activating a write-in control signal on the basis of the comparison; and said depth information display buffer including a two-port memory means for storing the depth information in accordance with the write-in control signal, said two-port memory means including a random port through which the calculated depth information stored in the depth information storing means is entered, and including a serial port through which the calculated depth information is supplied to said delay means.

* * * * *